United States Patent
An et al.

(10) Patent No.: US 9,800,955 B2
(45) Date of Patent: Oct. 24, 2017

(54) METHOD AND SYSTEM FOR SIGN LANGUAGE TRANSLATION AND DESCRIPTIVE VIDEO SERVICE

(71) Applicant: Samsung Electronics Co., Ltd., Gyeonggi-do (KR)

(72) Inventors: Junyoung An, Daegu (KR); Sangwook Lee, Gyeonggi-do (KR); Kyungmi Jang, Gyeonggi-do (KR); Minje Lee, Daegu (KR); Seungwon Yang, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 462 days.

(21) Appl. No.: 14/265,880

(22) Filed: Apr. 30, 2014

(65) Prior Publication Data

US 2015/0317304 A1 Nov. 5, 2015

(30) Foreign Application Priority Data

Apr. 30, 2013 (KR) ........................ 10-2013-0048710

(51) Int. Cl.

| | |
|---|---|
| *G11B 27/00* | (2006.01) |
| *H04N 21/854* | (2011.01) |
| *G06F 17/28* | (2006.01) |
| *G11B 27/036* | (2006.01) |
| *H04N 5/265* | (2006.01) |
| *H04N 5/93* | (2006.01) |
| *G10L 15/26* | (2006.01) |
| *G06N 3/08* | (2006.01) |

(52) U.S. Cl.
CPC ......... *H04N 21/854* (2013.01); *G06F 17/289* (2013.01); *G06N 3/084* (2013.01); *G10L 15/265* (2013.01); *G11B 27/036* (2013.01); *H04N 5/265* (2013.01); *H04N 5/9305* (2013.01)

(58) Field of Classification Search
CPC ... G11B 2220/90; G11B 27/034; G11B 27/34; G11B 27/024; G11B 27/036
USPC ........................................................ 386/285
See application file for complete search history.

(56) References Cited

U.S. PATENT DOCUMENTS 8,566,075 B1* 10/2013 Bruner ........... H04N 21/234336
704/2

FOREIGN PATENT DOCUMENTS

KR 10-1130276 3/2012

* cited by examiner

*Primary Examiner* — William C Vaughn, Jr.
*Assistant Examiner* — Daniel Tekle
(74) *Attorney, Agent, or Firm* — The Farrell Law Firm, P.C.

(57) ABSTRACT

A method and a system for a sign language translation and descriptive video service are disclosed. The method and system enables an easy preparation of video including a descriptive screen and a sign language so that a hearing-impaired person and a visually impaired person can receive a help for using a video media. The method includes extracting a character string in a text form from a caption of an original video; translating the character string in the text form extracted from the caption of the original video to a machine language; matching the character string translated to the machine language with a sign language video in a database; synchronizing the original video with the sign language video, and mixing the original video and the synchronized sign language video; and editing the sign language video with a sign language video editing tool.

15 Claims, 11 Drawing Sheets

| UNIT | MORPHEME ANALYSIS |
|------|-------------------|
| [김연아는] | 김연아/NNP+는/JKS |
| ["] | "/SS |
| [안녕] | 안녕/IC |
| ["] | "/SS |
| [이라고] | 이라고/JKQ |
| [했다] | 하/VV+았/EP+다/EF |
| [.] | ./SF |

| SIGN LANGUAGE REGISTRATION | | | | | | | |
|---|---|---|---|---|---|---|---|
| | | | | HOUR ☐ MIN ☐ SEC ☐ SIGN LANGUAGE ☐ X SPEED ☐ EDIT | | | |
| No. | HOUR | MIN | SEC | SIGN LANGUAGE | VOICE | X SPEED | CAPTION |
| 1 | 0 | 0 | 2 | 황혼 | NONE | 1.000000 | 황혼이 와서 |
| 2 | 0 | 0 | 3 | 연못 | NONE | 1.000000 | |
| 3 | 0 | 0 | 4 | 와서 | NONE | 1.000000 | 어둠이 모든 것을 삼키려 해도 |
| 4 | 0 | 0 | 5 | 모든 | NONE | 1.000000 | |
| 5 | 0 | 0 | 6 | 검사_1 | NONE | 1.000000 | |
| 6 | 0 | 0 | 7 | 감명 | NONE | 1.000000 | 가슴속에서 |
| 7 | 0 | 0 | 8 | 함경북도 | NONE | 1.000000 | |
| 8 | 0 | 0 | 9 | 금메달 | NONE | 1.000000 | 끝없이 반짝이는 별빛이어 |
| 9 | 0 | 0 | 10 | 반항심 | NONE | 1.000000 | |
| 10 | 0 | 0 | 11 | 별 | NONE | 1.000000 | 아침해처럼 지금 타올라라! |
| 11 | 0 | 0 | 12 | 아침 | NONE | 1.000000 | |
| 12 | 0 | 0 | 13 | -해 | NONE | 1.000000 | |
| 13 | 0 | 0 | 14 | 지금 | NONE | 1.000000 | |

FIG. 11

METHOD AND SYSTEM FOR SIGN LANGUAGE TRANSLATION AND DESCRIPTIVE VIDEO SERVICE

PRIORITY

This application claims priority under 35 U.S.C. §119(a) to a Korean Patent Application filed on Apr. 30, 2013 in the Korean Intellectual Property Office, and assigned Serial No. 10-2013-0048710, the entire disclosure of which is incorporated herein by reference.

BACKGROUND

1. Field of the Invention

The present invention generally relates to a method and a system for a sign language translation and a descriptive video service and, more particularly, to a method and a system for a sign language translation and a descriptive video service enabling easy preparation of video including a descriptive screen and a sign language so that a hearing-impaired person and a visually impaired person can receive help for using a video media.

2. Description of the Related Art

Visually impaired persons can receive information mainly through an auditory organ. Visually impaired persons can receive only the information of person's speech or sounds through video media such as TV broadcasting because the visually impaired persons cannot detect a movement and/or an action in video media. In order to solve this problem, a broadcasting station may provide a descriptive video service.

Hearing-impaired persons communicate through sign language or text shown in a screen or on paper. However, the communication through the text generates problems such as information distortion and loss, and thereby cannot present a sufficient meaning due to different grammar and expression systems.

The communication between a hearing-impaired person and a person without such a disability is generally performed through a sign language interpreter or a text. However, the method of communicating through the sign language interpreter is practically limited due to its expense. Therefore, a simple text is mainly used to communicate with the hearing-impaired person. For some languages, such as the Korean language, due to differences between the dactylology and Korean grammar, and different expressions, a hearing-impaired person frequently cannot understand a correct meaning of the text.

Hearing-impaired persons generally don't have a sufficient opportunity of learning a voice language in relation to the text interpretation, and thereby may experience inconveniences in analytically interpreting a text.

A method of sign language broadcasting generally utilizes a sign language interpreter. However, the method of sign language broadcasting is performed by preparing a sign language video based on an original video and editing the sign language video corresponding to the original video. Subsequently, the editing is performed through a process of inserting the sign language video into the original video in an On Screen Display (OSD) form. The method of preparing a sign language video by a broadcasting station has a high degree of accuracy because the sign language video is directly prepared responding to a person; however, it has a disadvantage of being limited to contents provided by the broadcasting station.

In the meantime, great efforts are being made to overcome these disadvantages and problems and to provide an easy method of inserting a sign language video. For this, efforts are proceeding to extract audio data from a video and to display the audio data by automatically translating the audio data to a sign language. However, these efforts have a disadvantage of decreasing the accuracy of translation. For example, the recognition rate of audio must be higher than a predetermined value. Further, even though a sufficient recognition rate may be achieved, errors can be generated in the process of translating to a sign language. The dactylology generally follows Korean grammar system; however, the dactylology doesn't express a postposition but requires a sentence division. Further, the dactylology has a different structure from the Korean grammar system, because a subject, object, and complement must be distinguished in a multiple clause.

Therefore, errors can be generated in the process of extracting characters from a recognized audio data. Further, the accuracy of translation can decrease due to an error generated in the process of translating to a sign language.

SUMMARY

The present invention has been made to address at least the above mentioned problems and/or disadvantages and to provide at least advantages described below. Accordingly, an aspect of the present invention is to provide a method and a system for a sign language translation and a descriptive video service, which include a descriptive screen having a high accuracy in a video media provided for hearing-impaired persons and visually impaired persons.

In accordance with an aspect of the present invention, a method for a sign language translation and descriptive video service is disclosed. The method includes extracting a character string in a text form from a caption of an original video; translating the character string in the text form extracted from the caption of the original video to a machine language; matching the character string translated to the machine language with a sign language video in a database; synchronizing the original video with the sign language video, and mixing the original video and the synchronized sign language video; and editing the sign language video with a sign language video editing tool.

In accordance with an aspect of the present invention, a system for a sign language translation and descriptive video service is disclosed. The method includes a machine language translator configured to extract a character string in a text form from a caption of an original video and to translate the character string in the text form to a machine language; a sign language processor configured to match the character string translated by the machine language translator with each sign of the sign language and to generate a translated sign language by connecting to matching sign language videos; a video mixer configured to display a caption in the original video and to play the original video mixed with a sign language video; a storage unit configured to store a barrier free video processed by the video mixer; and a barrier free tool unit configured to retrieve and play the original video or the barrier free video.

In accordance with an aspect of the present invention, a method of translating a sign language and descriptive video service for a hearing-impaired person and a visually-impaired person is provided. The method includes generating a character from a caption of an original video for the hearing-impaired person; generating a sign language video by matching the generated character with a sign language video; and mixing the original video for the hearing-impaired person with the sign language video by synchronizing the videos.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. The same reference numerals are used throughout the drawings to refer to the same or like parts. Detailed descriptions of well-known functions and structures incorporated herein may be omitted to avoid obscuring the subject matter of the invention.

For the same reasons, some components in the accompanying drawings are emphasized, omitted, or schematically illustrated, and the size of each component does not fully reflect the actual size. Therefore, the present invention is not limited to the relative sizes and distances illustrated in the accompanying drawings.

In the present description, a "finger spelling" means a word not included in a sign language, such as a name, which is formed by combining Korean vowels and consonants with fingers in time and space.

In the present description, a "machine language translation" means translating a natural language used by the human to another language by using a computer and, more particularly, to a sign language.

In the present description, a "neural network algorithm" means an information processing system modeled on a nervous tissue of living things, which has a parallel and dispersion connection structure of elements and generates a necessary output by dynamically responding to an input received from the outside.

In the present description, SAMI (Synchronized Accessible Media Interchange) is a standard caption form of Microsoft Corporation. SAMI is a markup language having time information like HTML, and thereby can be synchronized with an original video. Files having an SMI extension are prepared according to the SAMI form.

In the present description, SAMI data can be extracted from a text stream by using a SAMI parser filter of DirectShow, and a video including a caption can be output by using a renderer filter.

In the present description, a "VMR" (Video Mixing Renderer) means a rendering technology representing a next generation video rendering for a windows platform, which provides a new mixing function added to the existing overlay mixer and video renderer.

Hereinafter, a system configuration for a sign language translation and a descriptive video service will be described in detail referring to the accompanying drawings.

Figure 1:
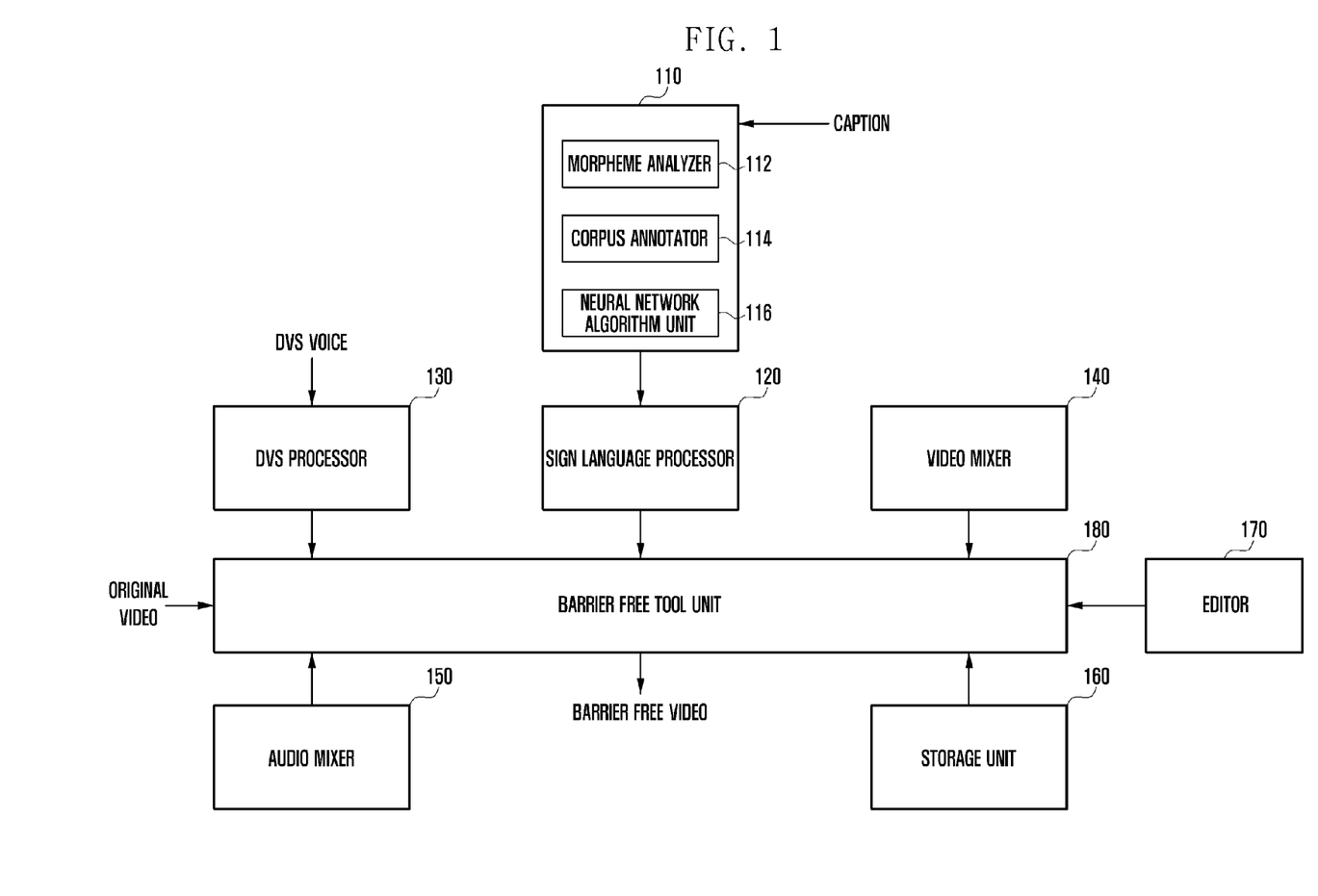
FIG. 1 is a block diagram illustrating a system configuration of translating a sign language and descriptive video service according to an embodiment of the present invention.

FIG. 1 is a block diagram illustrating a system configuration for translating a sign language and descriptive video service according to an embodiment of the present invention. Referring to FIG. 1, a character string in text form is extracted from caption data in a text form provided for an original video or from caption data generated by a user input. For example, the character string can be extracted from caption data in a SAMI form by using a SAMI parser filter of DirectShow. Further, the character string can be extracted from a video including a caption by using a renderer filter.

The character string in text form extracted from a caption must be processed through a machine language translation. A caption file is used as it is if the caption file is included in an original video, and an operation of adding a caption to an original file is performed if the caption file is not included. The operation of adding a caption may be performed by a user input through a UI as described hereinafter.

The system according to the present invention is configured with a machine language translator 110, sign language processor 120, DVS (Descriptive Video Service) processor 130, video mixer 140, audio mixer 150, storage unit 160, editor 170, and barrier free tool unit 180. The machine language translator 110 is configured with a morpheme analyzer 112, corpus annotator 114, and neural network algorithm unit 116.

The corpus annotator 114 performs a role of extracting a character string from a caption and separating the character string to be analyzed based on word spacing and symbols.

The morpheme analyzer 112 analyzes the character string separated by the corpus annotator 114 in a morpheme form. The character string analyzed in the morpheme form by the morpheme analyzer 112 is properly translated to a sign language through the neural network algorithm unit 116.

Figure 2:
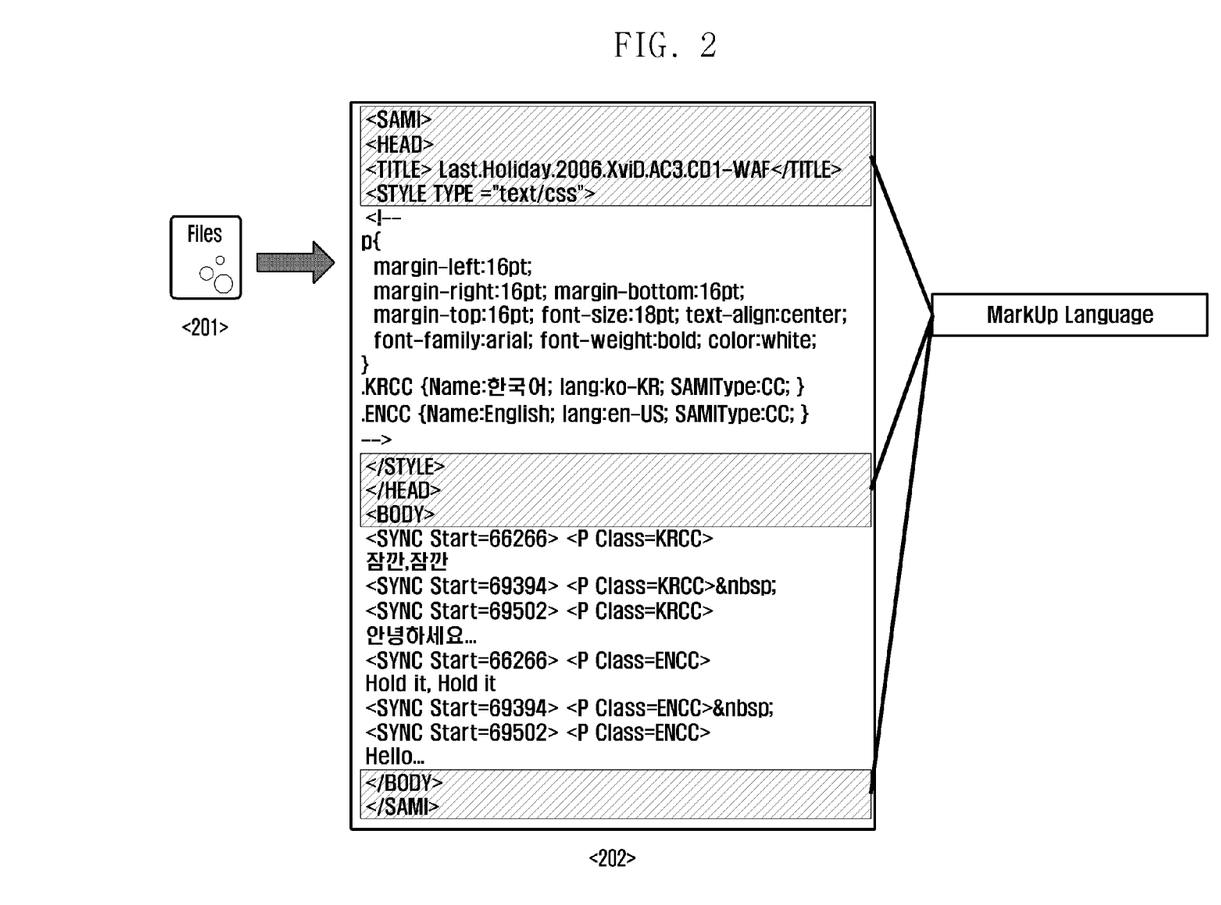
FIG. 2 is a format diagram illustrating an example of a format structure of a Synchronized Accessible Media Interchange (SAMI) file according to an embodiment of the present invention.

The corpus annotator 114 extracts a corresponding character string from a caption file in a markup language form. Referring to FIG. 2, reference number 201 indicates a SAMI file, and reference number 202 indicates an example of SAMI file format. Referring to reference number 202, the SAMI file format is indicated in a markup language form, and a SAMI caption file is divided into header and body sections. The header section includes locations of caption and language of caption file, font size of caption, and language used for the caption. The body section includes synchronizing information for an original video and a character string corresponding to an actual caption. The corpus annotator 114 extracts a character string from a caption and synchronization information of the character string corresponding to the original video.

The corpus annotator 114 performs a role of separating and dividing the character string extracted from the caption based on word spacing and symbols.

Word information is stored in a data dictionary (not shown) referred to by the corpus annotator 114, and words in the character string can be analyzed based on the data dictionary. As the contents of the data dictionary become large, the accuracy of separating corpuses becomes higher. The words separated from the corpuses are deduced, and the deduced words can be registered in the data dictionary if a user agrees with the deduced words.

The morpheme analyzer 112 performs an operation of separating information analyzed by the corpus annotator 114 according to word spacing and symbols into each morpheme.

The morpheme analyzer 112 separates information processed by the corpus annotator 114 into morphemes corresponding to the character string or word. The morpheme analyzer 112 separates the word processed by the corpus annotator 114 into morphemes and adds a tag to the morphemes by searching a grammar morpheme dictionary and vocabulary morpheme dictionary.

Figure 3:
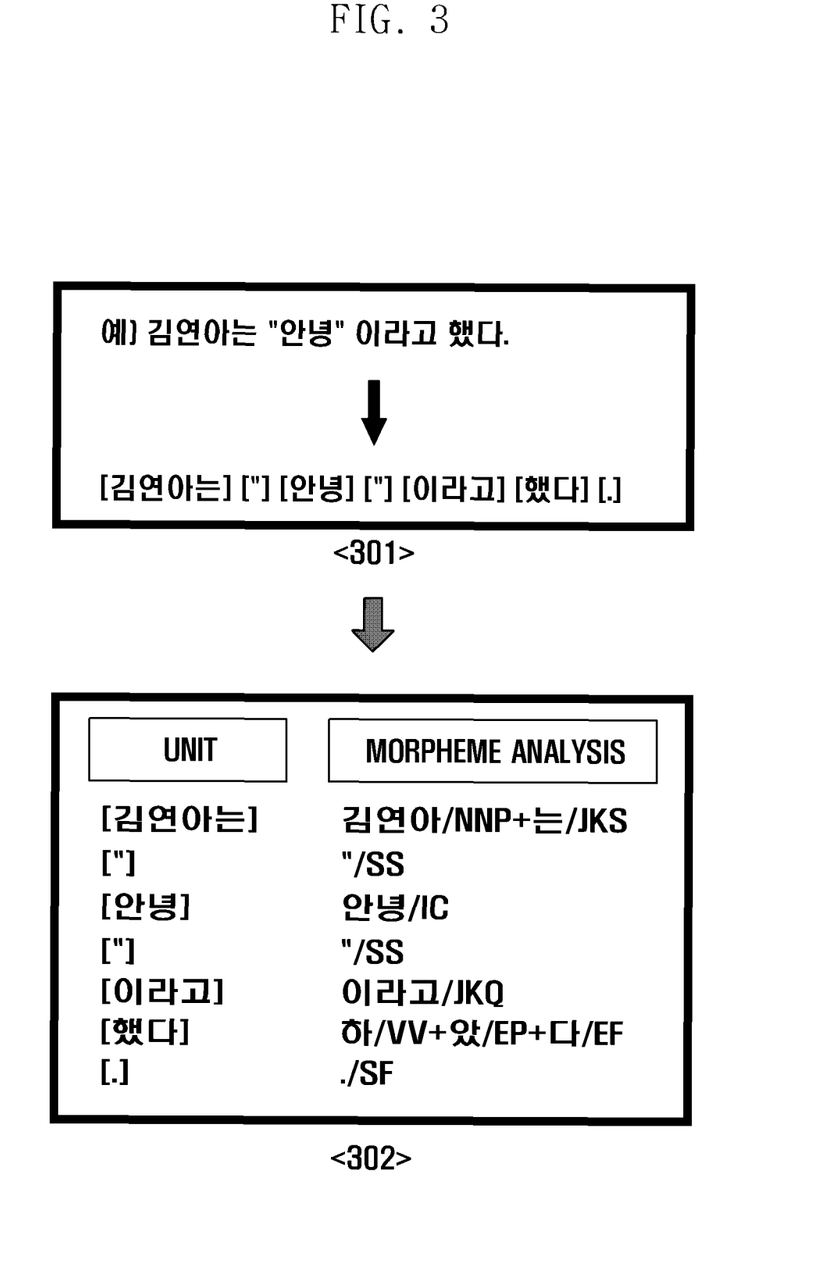
FIG. 3 illustrates a procedure of dividing a character string into morphemes and adding a tag to the morphemes.

The morpheme analyzer 112 separates again the character string pre-processed by the corpus annotator 114 into morphemes and adds a tag to the morphemes. FIG. 3 illustrates a procedure of dividing a character string to morphemes and adding a tag to the morphemes. A sentence "김연아는 "안녕"이라고 했다." (Yuna Kim said "Hello") is displayed in reference number 301 of FIG. 3. This character string is separated by the corpus annotator 114 based on word spacing and sentence identification symbols. For example, the sentence can be separated into [김연아는] ["] [이] ["] [안녕] [라고] [했다] [.]. Referring to reference number 302, the separated character string may be separated again into morpheme units by the morpheme analyzer 112.

A tag is added to every morpheme of the separated character string by the morpheme analyzer 112. A word tag will be described based on Sejong Word Tags. The following tables indicate a Sejong word tag classification which is most commonly used for categorizing the morpheme. However, the classification of word tags is not limited to the Sejong Word Tags, and may use other various word tags.

Table 1 indicates uninflected words of the Sejong Word Tags, and Table 2 indicates predicates of the Sejong Word Tags. Table 3 indicates modifiers of the Sejong Word Tags, and Table 4 indicates orthotones of the Sejong Word Tags. Table 5 indicates relatums of the Sejong Word Tags, and Table 6 indicates dependent forms of the Sejong Word Tags. Lastly, Table 7 indicates symbols of the Sejong Word Tags.

TABLE 1

| Class | Group | Item |
|---|---|---|
| (1) uninflected word | noun NN | common noun NNG<br>proper noun NNP<br>bound noun NNB |
| | pronoun NP | |
| | numeral NR | |

TABLE 2

| (2) predicate | verb VV | |
| --- | --- | --- |
| | adjective VA | |
| | auxiliary predicate VX | |
| | copula VC | affirmation copula VCP |
| | | denial copula MAJ |

TABLE 3

| (3) modifier | determiner MM | |
| --- | --- | --- |
| | adverb MA | general adverb MAG |
| | | conjunctive adverb MAJ |

TABLE 4

| (4) orthotone | exclamation IC |
| --- | --- |

TABLE 5

| (5) relatum | case postposition JK | main postposition JKS |
| --- | --- | --- |
| | | auxiliary postposition JKC |
| | | genitive postposition JKG |
| | | object postposition JKO |
| | | adverbial postposition JKB |
| | | vocative particle JKV |
| | | quotation postposition JKQ |
| | auxiliary particle JX | |
| | connective postposition JC | |

TABLE 6

| (6) dependent form | ending E | prefinal ending EP |
| --- | --- | --- |
| | | final ending EF |
| | | connective ending EC |
| | | noun type changing ending ETN |
| | | determiner changing ending ETM |
| | prefix XP | uninflected word prefix XPN |
| | suffix XS | noun derivative suffix XSN |
| | | verb derivative suffix XSV |
| | | adjective derivative suffix XSA |
| | | (adverb derivative suffix XSB) |
| | root XR | |

TABLE 7

| (7) symbol | period, question mark, exclamation mark | SF |
| --- | --- | --- |
| | comma, middle point, colon, slash | SP |
| | quotation mark, parenthesis, hyphen | SS |
| | ellipses | SE |
| | include dash (wave, hidden, and omitted) | SO |
| | foreign language | SL |
| | Chinese letter | SH |
| | other symbols (logical, mathematic, and currency symbol) | SW |
| | noun estimation category | NF |
| | predicate estimation category | NV |
| | numeral | SN |
| | analysis paralysis category | NA |

If morphemes displayed in FIG. 3 are tagged referring to Tales 1 to 7, 김연아 in [김연아는] is a proper noun, and thereby is tagged with NNP referring to Table 1. 는 in [김연아는] is a main postposition, and thereby is tagged with JKS referring to Table 5. ["] is a quotation mark of sentence identification symbol, and thereby is tagged with SS referring to Table 7. [안녕] may be an exclamation or a noun according to the classification of words. Here, the word 안녕 is surrounded by quotation marks, and thereby is processed as an exclamation. Therefore, 안녕 is tagged with IC referring to Table 4. ["] is a quotation mark of sentence identification symbol, and thereby is tagged with SS referring to Table 7. [이라고] indicates a quotation postposition, and thereby is tagged with JKQ referring to Table 5. [했다] is divided into 하, 었, and 다. 하 is a verb having a root of 하다, and thereby is tagged with VV referring to Table 2. 었 is a prefinal ending indicating a tense, and thereby is tagged with EP referring to Table 6. 다 is a final ending, and thereby is tagged with EF referring to Table 6. Lastly, [.] is a period, and thereby is tagged with SF referring to Table 7.

Figure 4:
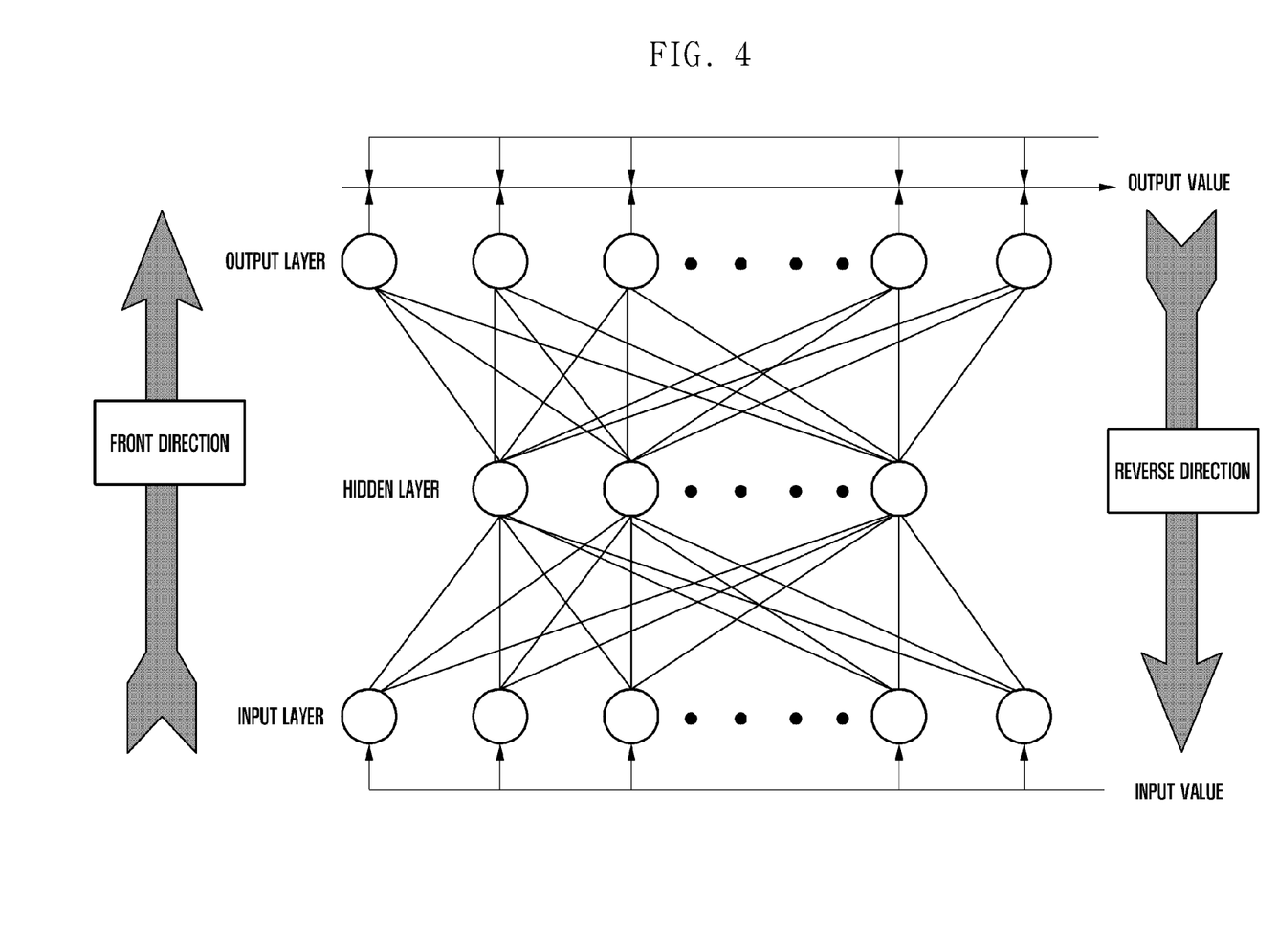
FIG. 4 illustrates an example of neural network algorithm for translating a character string to a sign language according to an embodiment of the present invention.

The neural network algorithm unit 116 translates a tagged character string as described above. FIG. 4 illustrates an example of a neural network algorithm for translating a character string to a sign language according to an embodiment of the present invention. Referring to FIG. 4, in the case of matching a number of character strings to sign languages, the character strings can be matched with a wrong sign language. Accordingly, it is desirable to minimize errors by post-processing the character strings even in the case of analyzing a single sentence.

Based on these characteristics, translation according to a neural network is performed so that various words having an identical meaning can be correctly matched with a sign language word through a user's post-processing operation after the translation.

Here, the translation according to the neural network is completed if a deviation value converges on a predetermined value.

A structure of multilayer perceptron (MLP) shown in FIG. 4 is configured with 3 layers including an input layer, a hidden layer, and an output layer. A sigmoid function is used as an activation function to output a result value with minimized deviation. Further, a learning method is provided by using an error back propagation learning algorithm.

The sign language processor 120 matches a character string translated by the machine language translator 110 with each sign of the sign language, generates a sign language video by connecting to the matched sign language videos, and transmits the generated sign language videos with a synchronization signal included in the character string to the barrier free tool unit 180.

The DVS processor 130 processes an input of DVS voice to explain an original video with a voice to a visually impaired person as described above. A user may input a DVS voice in a corresponding location while watching the original video. For example, the DVS voice may include a situation description, a detailed description, and additional description of the original video so that the situation of the corresponding video can be easily understood.

The DVS processor 130 receives a DVS voice input in an analog form, synchronizes with an original video, and converts the analog DVS voice to digital DVS voice data.

The DVS processor 130 transmits the digital DVS voice data with a synchronization signal to the barrier free tool unit 180 so as to be matched with the original video.

The video mixer 140 may insert a caption to a video using an On Screen Display (OSD) method. Alternatively, the video mixer 140 may divide a screen to play a barrier free video in each divided screen and to play a synchronized sign language video in another divided screen as shown in a UI of FIG. 5. Here, a video mixed with at least one of the DVS voice data and the sign language video is called barrier free video.

Figure 5:
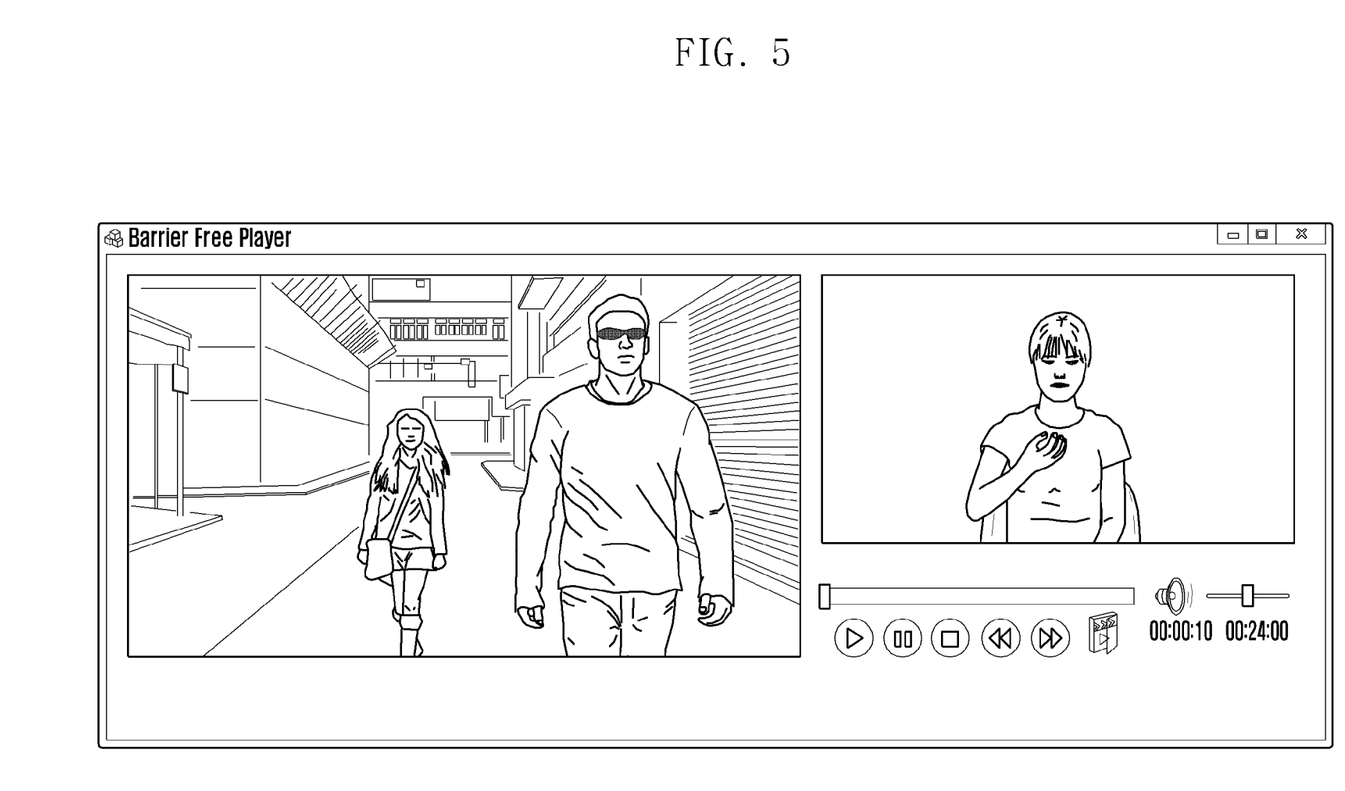
FIG. 5 illustrates a UI configured to play a sign language video corresponding to an original video according to an embodiment of the present invention.

However, it may be desirable to let a hearing-impaired person watch a large screen by playing a barrier free video and a sign language video in divided screens as shown in FIG. 5.

A user may input a caption through the editor 170, as already described in the machine language translator 110. The caption is prepared according to a caption preparation specification and includes a synchronization signal. Namely, when preparing a caption, the caption is synchronized by inputting in a desired location of the video.

The editor 170 edits a wrongly translated sign language video or inserts a missing sign language video, e.g., under control of a user. Further, a user may edit a DVS voice through the editor 170.

The barrier free tool unit 180 mixes an original video with a sign language video by synchronizing the videos. The synchronization of the sign language video is performed by matching with a synchronization signal included in a character string extracted from a caption, which is transmitted from the sign language processor 120.

If a request for playing a video is input, the barrier free tool unit 180 plays the video by allocating a sign language video and a barrier free video synchronized with the sign language video in a play frame provided by the video mixer 140. If the resolution of barrier free video is required to be changed, an encoding operation can be performed to change the resolution. Alternatively, the barrier free video may be configured with a big screen and the sign language video may be overlapped thereon in an OSD form.

Further, the barrier free tool unit 180 controls the audio mixer 150 to mix digital DVS voice data input through the DVS processor 130 with a barrier free video by synchronizing digital DVS voice data and the barrier free video. The barrier free video formed by mixing with the digital DVS voice data and the sign language video can be stored in the storage unit 160 if necessary.

The barrier free video formed by mixing with at least one of the digital DVS voice data and the sign language video can be retrieved from the storage unit 160 and edited through the editor 170 connected to the barrier free tool unit 180. Alternatively, the barrier free video can be played through the barrier free tool unit 180 by retrieving from the storage unit 160.

Figure 6:
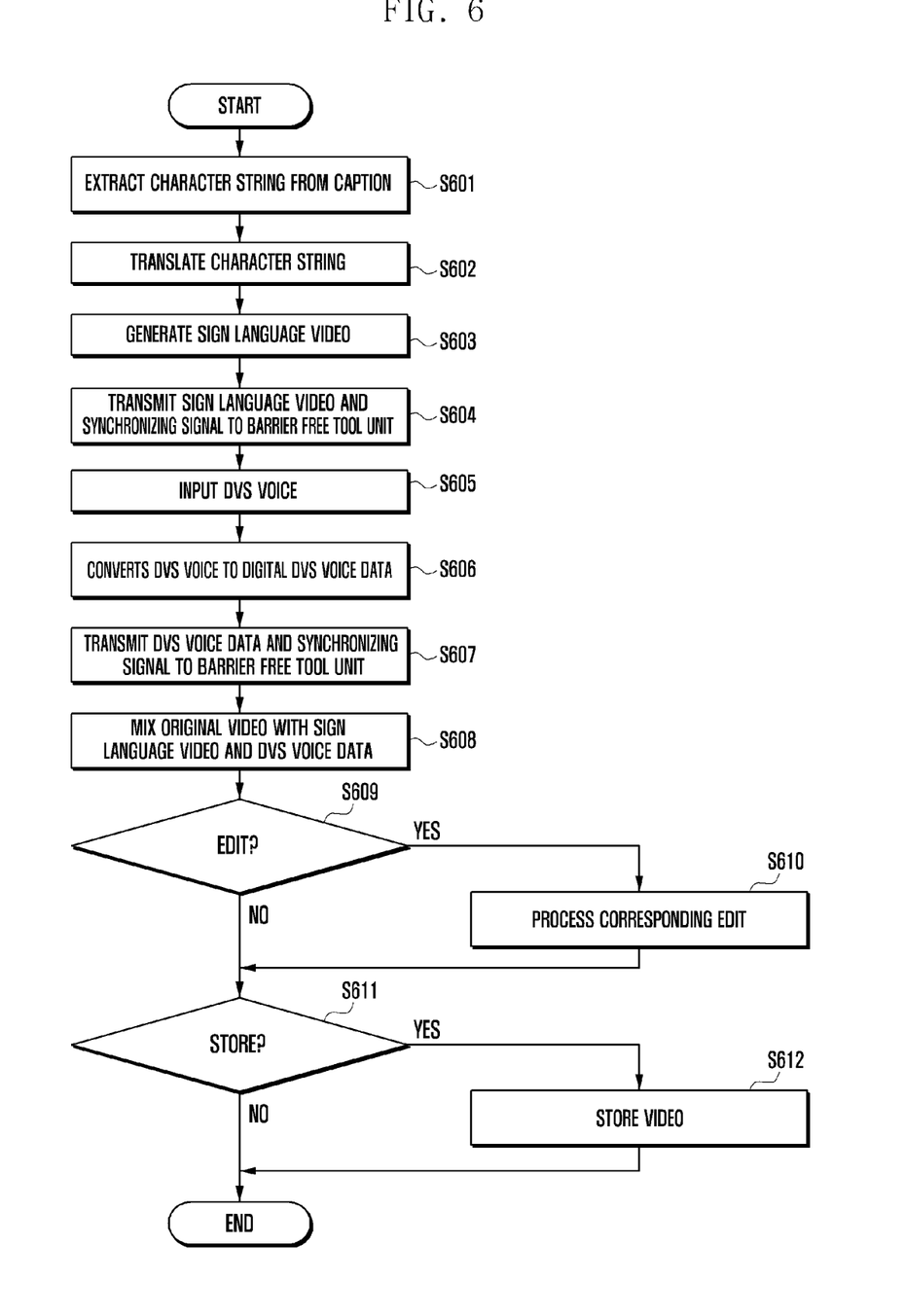
FIG. 6 is a flow chart illustrating a procedure of a sign language translation and descriptive video service according to an embodiment of the present invention.

FIG. 6 is a flow chart illustrating a procedure of translating a sign language and descriptive video service according to an embodiment of the present invention. Referring to FIG. 6, the machine language translator 110 extracts a character string in text form from caption data in a text from provided in an original video or from caption data generated by a user input at step S601.

The machine language translator 110 translates a character string in text form extracted from a caption to a machine language recognizable by a computer at step S602. Here, the corpus annotator 114 in the machine language translator 110 extracts character strings in text form from a caption, and separates the character string based on word spacing and sentence identification symbols.

The morpheme analyzer 112 analyzes morphemes separated from the character string and adds a tag, and the neural network algorithm unit 116 translates a sentence analyzed by morphemes. This will be described in more detail with reference to FIG. 9.

The sign language processor 120 matches the character string translated by the machine language translator 110 with each sign of the sign language formed in a database, and generates a translated sign language video by connecting to the matching sign language signs at step S603. The sign language processor 120 transmits the generated sign language video with a synchronization signal extracted from the caption to the barrier free tool unit 180 at step S604.

At step S605, the user inputs a DVS voice through the DVS processor 130 for a visually impaired person who will watch the barrier free video. The DVS voice performs a role of helping the visually impaired person in understanding a situation developed by the corresponding video through a situation description, detailed description, and additional description of the video being played.

The DVS processor 130 receives an input analog DVS voice and converts to digital DVS voice data at step S606. The DVS processor 130 transmits the DVS voice data converted into a digital form and a synchronization signal for synchronizing with the barrier free video to the barrier free tool unit 180 at step S607.

Steps S601 to S604 are for inputting a sign language sign and transmitting it to the barrier free tool unit 180, and steps S605 to S607 are for inputting a DVS voice and transmitting it to the barrier free tool unit 180. For convenience in explanation in the drawing of FIG. 6, steps S601 to S604 of translating into a machine language are performed first and the steps S605 to S67 of inputting a DVS voice are performed after steps S601 to S604. However, in a practical application, steps S601 to S604 and the steps S605 to S607 may be performed regardless of the order. For example, in a case where 2 users are involved, each user may input a DVS voice in different sequences, or steps S605 to S607 may be performed first and steps S601 to S604 may be performed later. Namely, the order of performing steps S601 to S604 and steps S605 to S607 may be selectively changed.

The barrier free tool unit 180 mixes the original video with a sign language video through the video mixer 140, and with DVS voice data through the audio mixer 150 according to the synchronization signal at step S608.

The barrier free tool unit 180 determines whether a video mixed with at least one of the sign language video and the DVS voice data will be edited at step S609. For example, the barrier free tool unit 180 determines whether an edit command for the video is input by the user.

If the edit command for the video is determined to be input at step S609, the barrier free tool unit 180 can edit at least one of the DVS voice data, the sign language video, and the caption included in the original video or barrier free video corresponding to the edit command at step S610. For example, if a caption is edited, the corresponding sign language video can also be changed.

If it is determined not to edit a barrier free video at step S609, the barrier free tool unit 180 determines whether to store the barrier free video at step S611.

If it is determined to store the barrier free video at step S611, the barrier free video is stored in the storage unit 160 at step S612.

If it is determined not to store the barrier free video at step S611, the barrier free tool unit 180 doesn't store the barrier free video and terminates its function.

Figure 7:
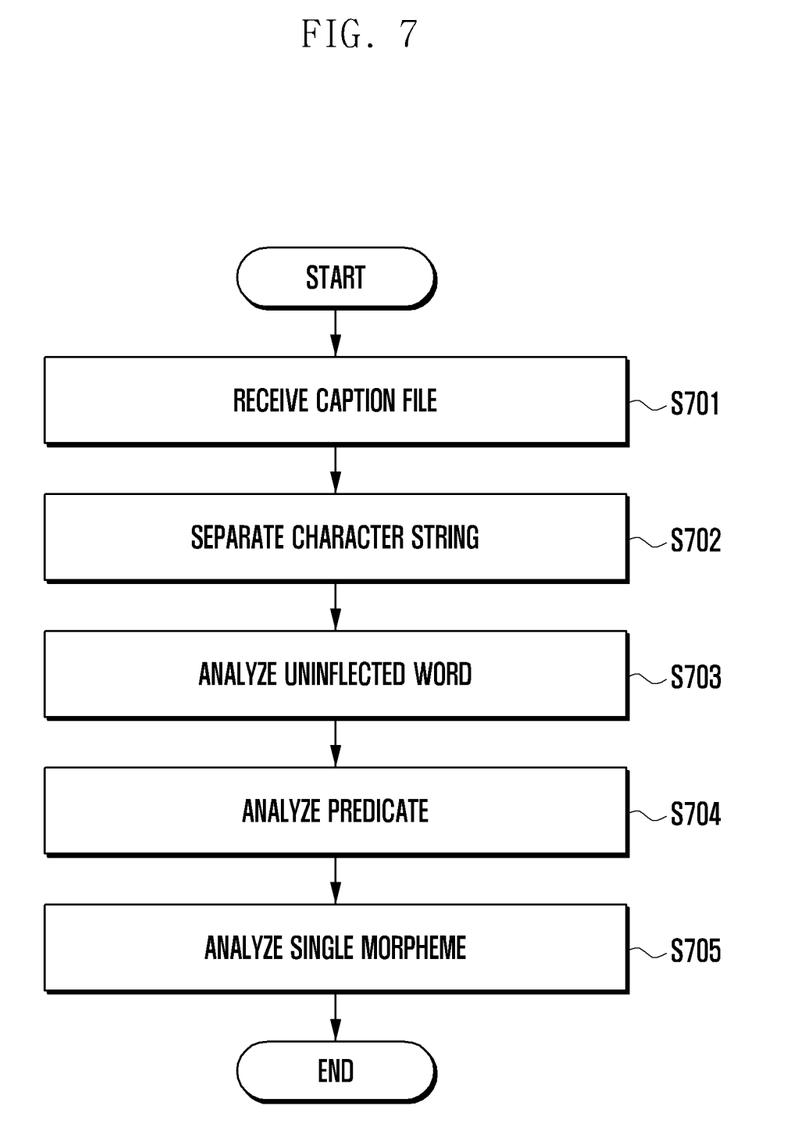
FIG. 7 is a flow chart illustrating a schematic procedure of translating to a machine language according to FIG. 6 of the present invention.

FIG. 7 is a flow chart illustrating a schematic procedure of translating to a machine language according to FIG. 6 of the present invention. Referring to FIG. 7, the corpus annotator 114 first receives a caption file corresponding to the original video at step S701. The corpus annotator 114 then extracts a character string from the caption file at step S702. Further, the corpus annotator 114 separates the character string based on word spacing and sentence identification symbols.

The morpheme analyzer 112 analyzes uninflected words at step S703. A postposition is commonly added to the uninflected word, and the morpheme analyzer 112 analyzes each uninflected word and postposition. For example, [심연아는] of FIG. 2 may be analyzed as an uninflected word.

The morpheme analyzer 112 analyzes predicates at step S704. The predicate is divided into a root and an ending, and the morpheme analyzer 112 analyzes each root and ending. For example, [했다] of FIG. 2 may be analyzed as a predicate.

The analysis of uninflected words and the analysis of predicates in steps S703 and S704 are portions of the morpheme analysis. The order of steps S703 and S704 can be changed, and steps S703 and S704 can be repeated according to the structure of the sentence.

The morpheme analyzer 112 analyzes the morphemes by configuring the morphemes into a single sentence of character string units at step S705.

The neural network algorithm unit 116 translates the character string configured in a single sentence of morpheme units to a machine language. For example, a sentence is translated by dividing into a subject, object, and verb so that the sentence can be expressed as a sign language.

Figure 8:
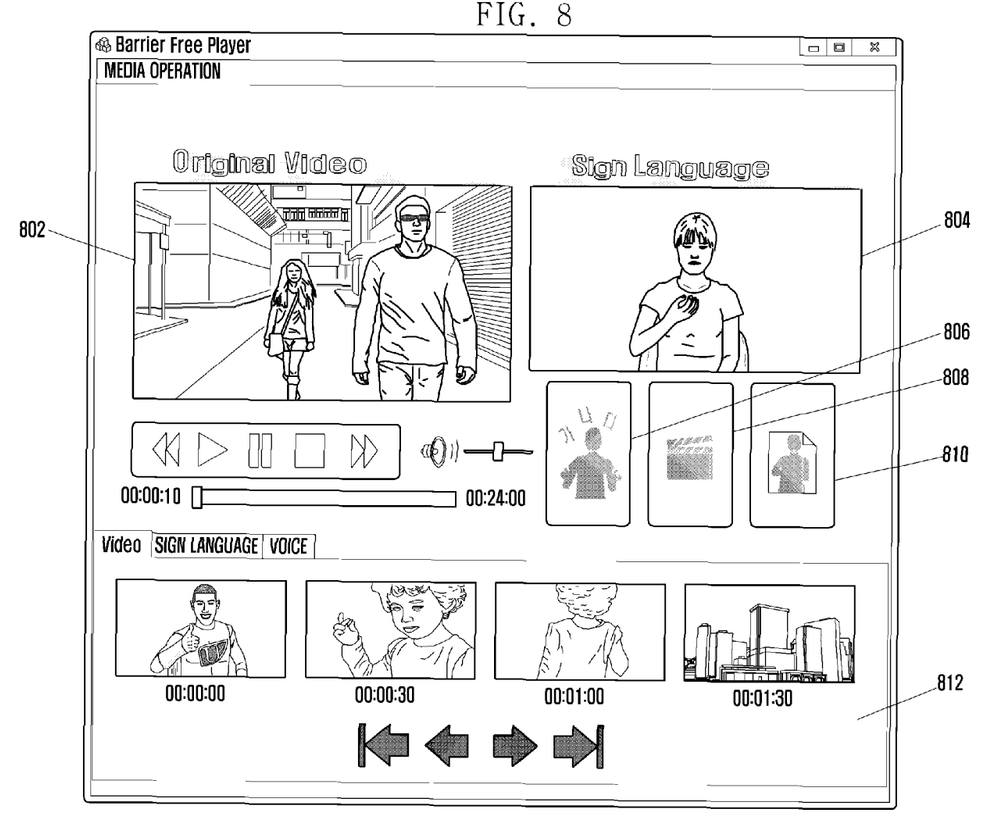
FIG. 8 illustrates a UI for editing a barrier free video according to an embodiment of the present invention.

FIG. 8 illustrates a UI for editing a barrier free video according to an embodiment of the present invention. Referring to FIG. 8, sign language videos matching each sign language word are recorded and synthesized in a database (DB) form so as to be utilized for a project. The sign language in the database is displayed by matching with a translated character string. Because the character string is extracted from the caption file together with a synchronization signal, the video mixer 140 mixes the original video with a sign language video by synchronizing the videos.

The sign language video generated by the above process can be edited through the editor 170. A main menu for a video editing function is configured with a video player 802 located at the left upper side for playing an original video or a barrier free video, a sign language video player 804 located at the right upper side for playing a sign language video by synchronizing with the player 802, a caption translation menu 806, a sign language video edit menu 808, a task open menu 810 located at the lower side of the sign language video player 802, and a timeline area 812 located at the lowest side. In the meantime, the sign language video can be played in the video player 802 as an OSD.

The state of translating a sign language can be identified by referring to a translated sign language video displayed by synchronizing with a barrier free video. Here, if a section of the barrier free video doesn't match a sign language video, the section can be edited by using a sign language tab of the timeline area 812 and comparing with a caption displayed in a character string form, which is the content of the registered sign language.

Figure 9:
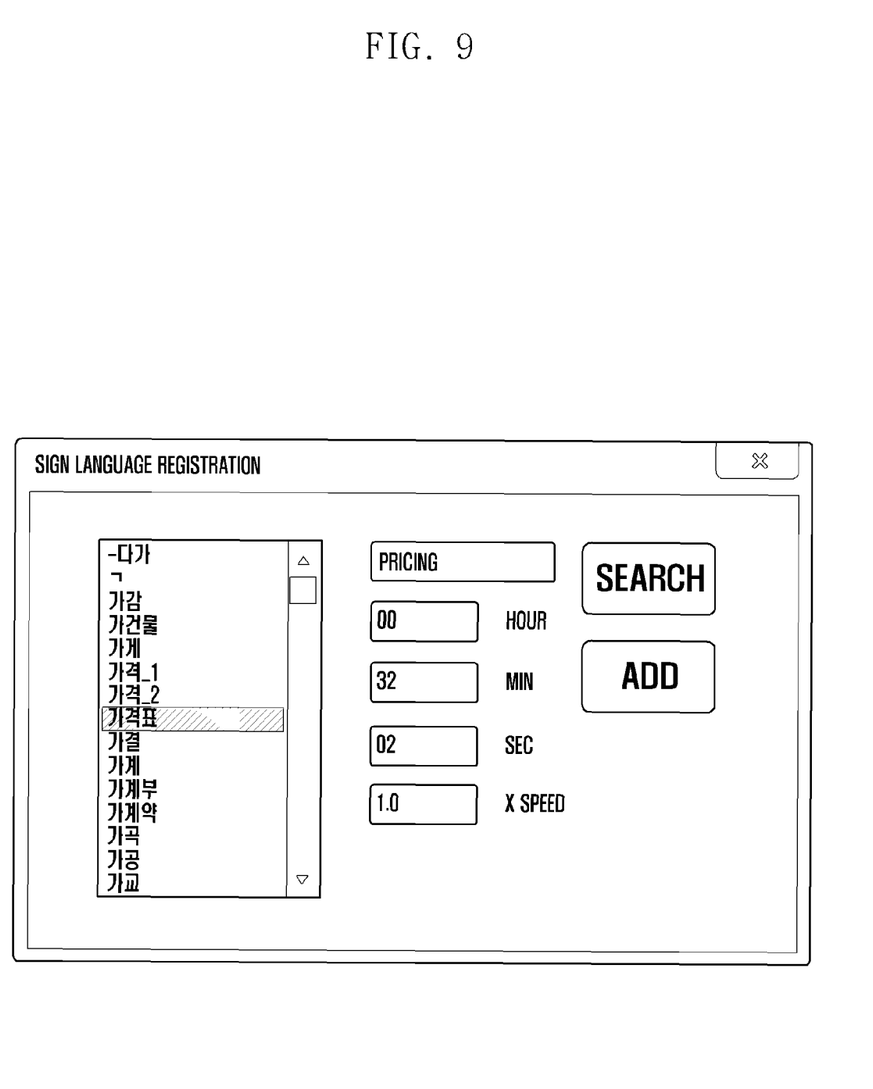
FIG. 9 illustrates a UI for registering a sign language according to an embodiment of the present invention.

If a strange or missing scene is discovered while identifying a sign language video, the sign language video can be replaced by another sign language video registered in the database through a sign language registration menu or a sign language video edit menu 808. FIG. 9 illustrates a UI screen in which a sign language can be registered. Referring to FIG. 9, the UI screen for registering a sign language provides a manual registration function so that a user can play a sign language video in a desired time after identifying a translated sign language. Words found by searching are displayed in a list located at the left side. If an Add button is pressed after inputting hour, minute, second, and speed, a sign language video is added in a task area. For example, if a sign language corresponding to a word '가격표' (price list) is missing at the section time 32 min 2 sec of the barrier free video, a corresponding sign language in a data dictionary can be found by pressing a Search button with the word '가격표' selected. The sign language video of '가격표' is in a time band corresponding to the barrier free video. For example, if 32 min 02 sec is input, the sign language is inserted in the play time 32 min 2 sec of the barrier free video. Here, the corresponding caption is not changed but can be edited if necessary.

The user may perform a translation for a caption of the original video retrieved by selecting the caption translation menu 806 located at the lower side of the sign language player 804. For example, if the user executes the caption translation menu 806, a character string is translated through the aforementioned machine language translation process and a sign language video corresponding to the translated character string is inserted in the original video by mixing and synchronizing with the original video. The player 802 can then play the original video or barrier free video.

Figure 10:
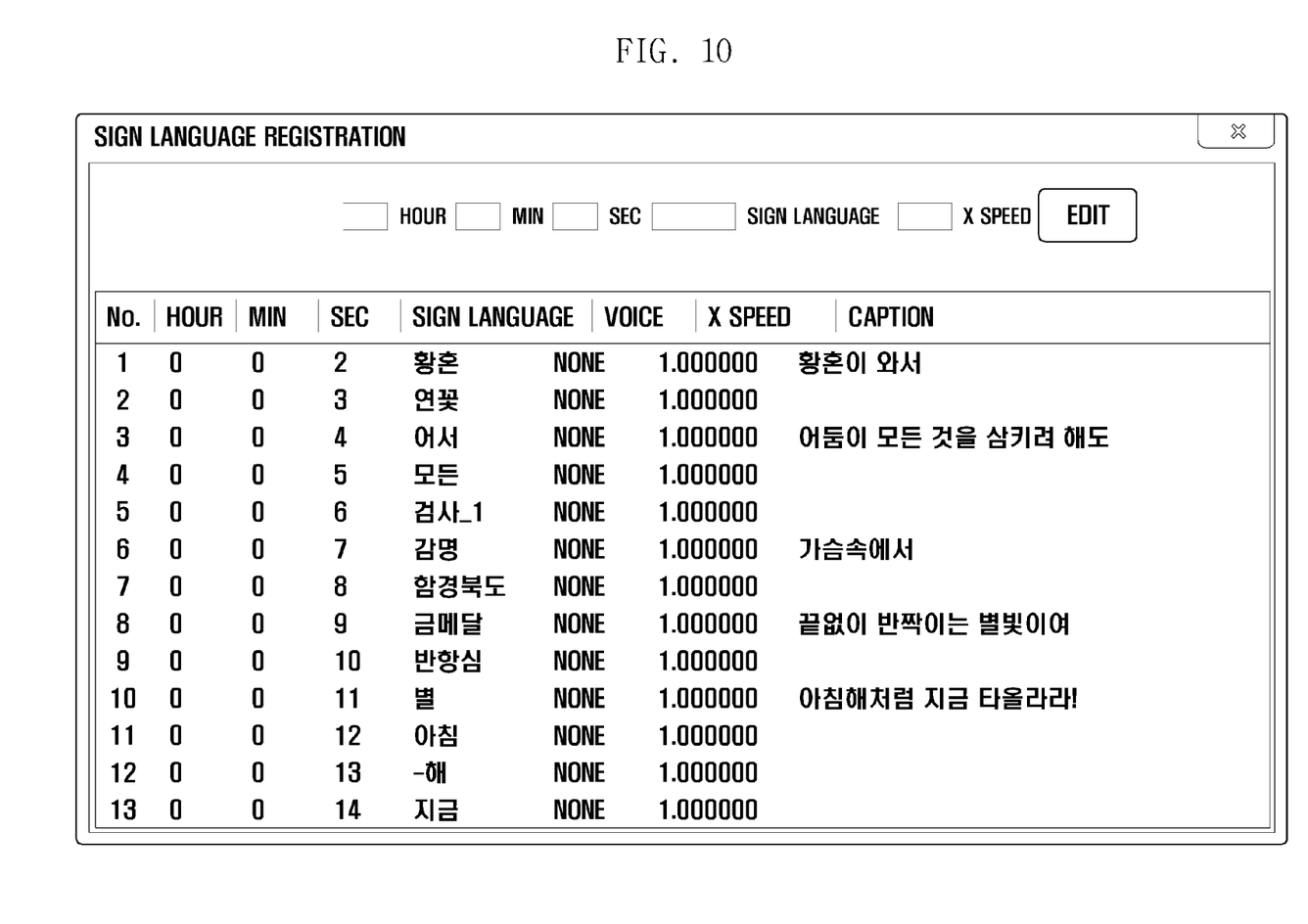
FIG. 10 illustrates a UI for executing an edit menu for sign language video according to an embodiment of the present invention.

The user may register and edit information required for a video mixed with the sign language video by selecting the sign language video edit menu 808. FIG. 10 illustrates a UI for executing an edit menu for sign language video according to an embodiment of the present invention. Referring to FIG. 10, a sign language video, a DVS voice, and a caption can be registered and edited by executing the sign language video edit menu 808. For example, if an improper sign language scene, which doesn't match the barrier free video, is found or a missing sign language video is found while editing the sign language video, the improper sign language video can be replaced by a proper sign language video, or a new proper sign language can be inserted. Because of differences in characteristics of the Korean language and Korean sign language, errors can be generated in an automatically translated sentence. For example, if a sentence "나는 큰 집을 샀다" (I bought a big house) is translated, the sentence could be analyzed as [다][크다][집][샀다], and if this sentence is translated to a sign language as it is, the meaning of the sentenced may be misunderstood as "나는 크다. 집을 샀다" (I am big. Bought a house). When translating the sentence to a sign language, the sentence should be analyzed in the order of [다][집][사다][집][크다]. Like this, if an improper sign language scene not matching the original video is found while the user edits a video mixed with a sign language video, the improper sign language scene can be replaced by a proper sign language video. Here, the proper sign language video may be retrieved by searching a DB in which sign language videos are stored corresponding to the data dictionary, and the improper sign language video can be replaced by searching for a necessary sign language video and pressing an Edit button.

By using the task open menu 810, a barrier free video previously inserted with a translated sign language video or a DVS (Descriptive Video Service) can be retrieved. Alternatively, an original video not inserted with a sign language or a DVS voice also can be retrieved. A caption may be inserted into a video retrieved by executing the task open menu 810, and translated or mixed with a DVS voice.

Referring back to FIG. 8, the timeline area 812 is configured with 3 tabs including a video tab, a sign language tab, and a voice tab. The timeline area 812 outputs a capture screen in a thumbnail form, preview or pre-listening in a predetermined period to indicate the state of outputting a video, sign language, and sound.

The video tab displays an original video in a capture screen of thumbnail form so that a user can easily search for an original video. For example, a thumbnail of video being played is displayed in the video tab of the timeline area 812, and thereby the user can estimate a play time of the video.

The sign language tab displays a sign language video and enables the user to identify a caption corresponding to a sign language video by displaying the caption in a character string form. Further, a caption corresponding to an original video or barrier free video can be input in the sign language tab. Here, the caption may be input in a predetermined caption specification, for example, the SAMI (Synchronized Accessible Media Interchange) specification.

The voice tab provides a pre-listening function of a DVS voice and an edit function for inputting or modifying a DVS voice so that the corresponding DVS voice can be input, modified, and additionally input if a section of video doesn't match a barrier free video or additional input of DVS voice is required. The voice tab provides a UI for inputting and editing a DVS voice. If a user inputs a voice in a section requiring a description through the DVS processor 130 while watching a video, the DVS processor 130 converts an analog DVS voice to a digital DVS voice data and transmits it to the barrier free tool unit 180. The barrier free tool unit 180 inserts the transmitted digital DVS voice data into the original video by synchronizing the digital DVS voice data and the original video, and a barrier free video inserted with the DVS voice data may be stored in the storage unit 160 if necessary.

Figure 11:
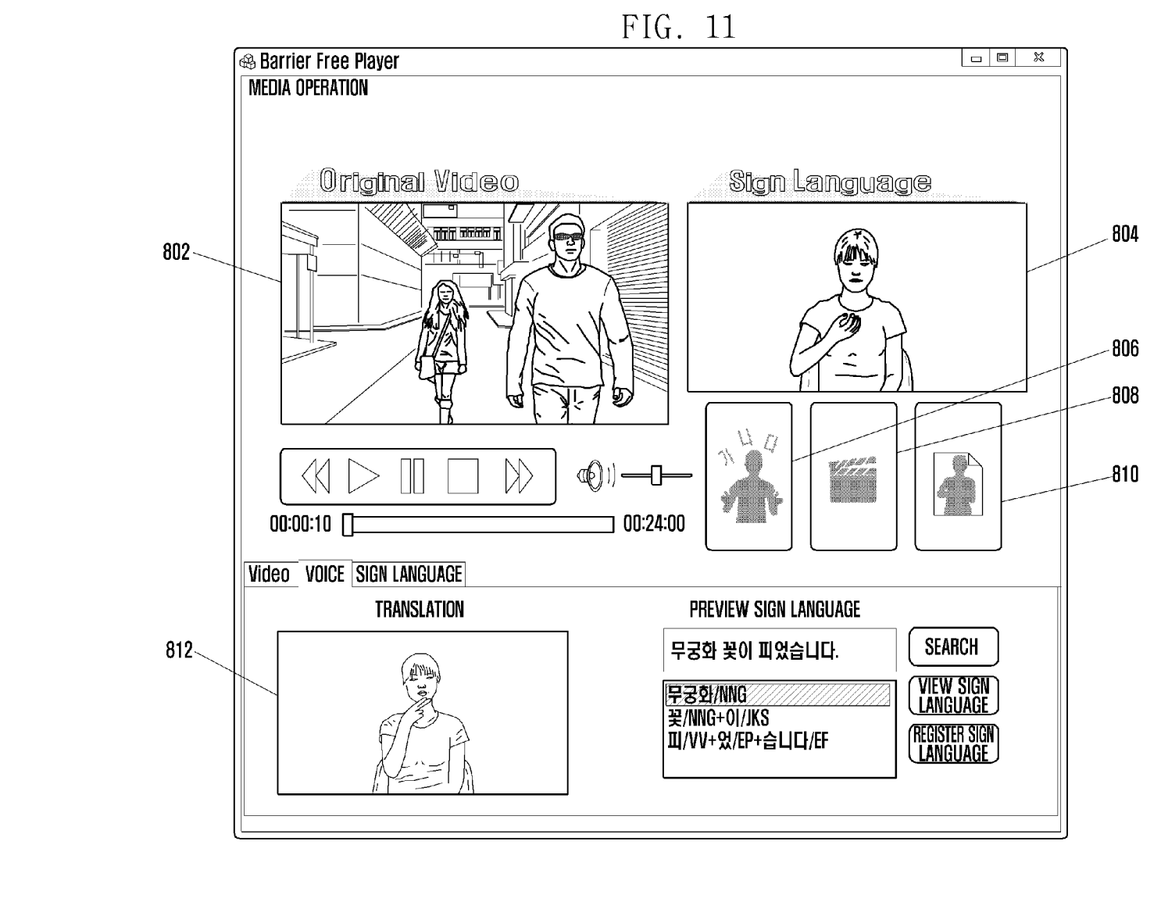
FIG. 11 illustrates a UI for editing a sign language according to an embodiment of the present invention.

FIG. 11 illustrates a UI for editing a sign language according to an embodiment of the present invention. Referring to FIG. 11, a caption can be input in the sign language tab as described in FIG. 8. The caption may be prepared by using a SAMI (Synchronized Accessible Media Interchange) authoring tool, and a character string can be extracted from the prepared caption by using a SAMI parser filter of DirectShow.

Input streams of a caption, a sign language video, and a screen description voice of the original video are mixed by using the video mixer 140 and the audio mixer 150. For example, an audio and video can be mixed with the original video by using a VMR filter of DirectShow which provides video mixing and audio mixing functions.

As described above, a method and a system for a sign language translating and descriptive video service according to embodiments of the present invention enable a program watching without the help of current media.

The present invention provides a sign language video correctly matching an original video, because the translation is performed according to an input caption, and a user can edit errors by searching a sign language video database.

Although embodiments of the present invention have been described in detail hereinabove, it should be understood that many variations and modifications of the basic inventive concept described herein will still fall within the spirit and scope of the invention as defined by the appended claims and their equivalents.

What is claimed is:

1. A method for a sign language translation and descriptive video service, the method comprising:
   extracting a character string in a text form from a caption of an original video;
   translating the character string to a machine language by:
      separating the character string based on a word space and a sentence identification symbol,
      separating the separated character string into morpheme units, and
      translating morpheme units to the machine language;
   matching the machine language with a sign language video in a database; and
   synchronizing the original video with the sign language video, and mixing the original video and the synchronized sign language video.

2. The method of claim 1, further comprising:
   inputting a Descriptive Video Service (DVS) voice for describing the original video by a user; and
   mixing the DVS voice by synchronizing with the original video.

3. The method of claim 2, further comprising:
   storing the mixed video.

4. The method of claim 1, wherein separating the separated character string into morpheme units comprises:
   analyzing an uninflected word of the separated character string;
   analyzing a predicate of the separated character string; and
   configuring the analyzed morphemes into a sentence.

5. The method of claim 2, further comprising:
   editing the signal language video with a sign language video editing tool; and
   editing the DVS voice mixed with the original video with the sign language video editing tool,
   wherein the sign language video editing tool comprises a sign language video database, a player for playing the original video and a sign language video mixed with the original video, and a timeline area displayed through the player.

6. The method of claim 5, wherein the timeline area provides a DVS voice editing tool and plays a DVS voice through the DVS voice editing tool.

7. The method of claim 5, wherein the caption is input by synchronizing with the original video through the timeline area.

8. The method of claim 5, wherein editing the sign language video with the sign language video editing tool comprises:
   identifying a translated sign language video displayed by synchronizing with the original video; and
   editing the sign language video by comparing the sign language video with the caption.

9. A system for a sign language translation and a descriptive video service, the system comprising:
   a machine language translator configured to extract a character string in a text form from a caption of an original video and to translate the character string to a machine language, wherein the machine language translator comprises:
      a corpus annotator configured to extract a character string from the caption, and to separate the character string into word spaces and sentence symbol units,
      a morpheme analyzer configured to separate the character string separated into morpheme units, and
      a neural network algorithm unit configured to translate morpheme units to the machine language;
   a sign language processor configured to match the machine language with each sign of the sign language and to generate a translated sign language by connecting to matching sign language videos;
   a video mixer configured to display a caption in the original video and to play the original video mixed with a sign language video;
   a storage unit configured to store a barrier free video processed by the video mixer; and
   a barrier free tool unit configured to retrieve and play the original video or the barrier free video.

10. The system of claim 9, further comprising:
    a Descriptive Video Service (DVS) processor configured to be connected to the barrier free tool unit and to process an input of a DVS voice for describing one of the original video or the barrier free video; and
    an audio mixer configured to mix the DVS voice processed by the DVS processor with one of the original video or the barrier free video.

11. The system of claim 10, further comprising:
    a DVS voice editor configured to be connected to the barrier free tool unit and to input or edit a caption in the original video or the barrier free video stored in the storage unit, to edit the sign language video mixed with the barrier free video stored in the storage unit, and to edit the DVS voice mixed with the barrier free video stored in the storage unit.

12. The system of claim 10, wherein the neural network algorithm unit uses a sigmoid function as an activation function.

13. The system of claim 10, wherein the neural network algorithm unit uses an error back propagation learning algorithm for a learning method.

14. A method of translating a sign language and descriptive video service for a hearing-impaired person and a visually-impaired person, the method comprising:
    generating a character from a caption of an original video for the hearing-impaired person;
    generating a sign language video by matching the generated character with a sign language video by:
       separating the generated character based on a word space and a sentence identification symbol,
       separating the separated character into morpheme units, and
       translating morpheme units to the machine language; and
    mixing the original video for the hearing-impaired person with the sign language video by synchronizing the videos.

15. The method of claim 14, further comprising editing the sign language video with an editing tool in the mixing.

* * * * *